US012699696B2

(12) United States Patent
Bensberg

(10) Patent No.: US 12,699,696 B2
(45) Date of Patent: Aug. 4, 2026

(54) USING SELF-MAINTAINING STRUCTURE INFORMATION FOR FASTER DATA ACCESS

(71) Applicant: SAP SE, Walldorf (DE)

(72) Inventor: Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 721 days.

(21) Appl. No.: 17/462,561

(22) Filed: Aug. 31, 2021

(65) Prior Publication Data

US 2023/0068358 A1 Mar. 2, 2023

(51) Int. Cl.
| | |
|---|---|
| *G06F 16/835* | (2019.01) |
| *G06F 16/21* | (2019.01) |
| *G06F 16/2453* | (2019.01) |
| *G06F 16/81* | (2019.01) |

(52) U.S. Cl.
CPC ...... *G06F 16/24542* (2019.01); *G06F 16/212* (2019.01); *G06F 16/213* (2019.01); *G06F 16/81* (2019.01); *G06F 16/8365* (2019.01); *G06F 16/8373* (2019.01)

(58) Field of Classification Search
CPC ... G06F 16/81; G06F 16/8365; G06F 16/8373
See application file for complete search history.

(56) References Cited

U.S. PATENT DOCUMENTS

| | | | | | |
|---|---|---|---|---|---|
| 5,974,418 | A | * | 10/1999 | Blinn | .................... G06F 16/972 |
| | | | | | 707/762 |
| 6,070,165 | A | * | 5/2000 | Whitmore | ............. G06F 16/284 |

| | | | | | |
|---|---|---|---|---|---|
| 2004/0054807 | A1 | * | 3/2004 | Harvey | .................. H04L 45/00 |
| | | | | | 709/239 |
| 2007/0050404 | A1 | * | 3/2007 | Hunter | .................... G06F 21/57 |
| 2010/0049935 | A1 | * | 2/2010 | Pichumani | ........ G06F 16/24568 |
| | | | | | 711/E12.001 |
| 2010/0325181 | A1 | * | 12/2010 | Skillcorn | ................ G06F 16/13 |
| | | | | | 707/829 |

(Continued)

FOREIGN PATENT DOCUMENTS

WO WO-2021087153 A1 5/2021

OTHER PUBLICATIONS

Liu, Z.H. et al., "Native JSON Datatype Support: Maturing SQL and NoSQL Convergence in Oracle Database," Proceeding of the VLDB Endowment, Sep. 14, 2020, vol. 13, No. 12, pp. 3059-3071.

(Continued)

*Primary Examiner* — Apu M Mofiz
*Assistant Examiner* — Dara J Glasser
(74) *Attorney, Agent, or Firm* — Mintz Levin Cohn Ferris Glovsky and Popeo, P.C.

(57) ABSTRACT

A method, a system, and a computer program product for accessing data. A schema representing a structure of an object in a plurality of objects stored in a storage location is generated. Each object includes one or more data elements. Each schema identifies one or more data elements of the object, an offset location of each data element of the object, and a value of each data element of the object. A query requesting access to one or more data elements is received. A generated schema in a plurality of generated schemas representing the queried object is identified. The elements are accessed using the identified generated schema, and retrieved.

17 Claims, 12 Drawing Sheets

(56)     References Cited

U.S. PATENT DOCUMENTS

| | | | |
|---|---|---|---|
| 2015/0293962 A1* | 10/2015 | van Oortmerssen | ... G06F 16/22 |
| | | | 707/756 |
| 2018/0375951 A1* | 12/2018 | Dhere | ................... H04L 67/565 |
| 2019/0332695 A1 | 10/2019 | Bensberg et al. | |
| 2021/0349946 A1* | 11/2021 | Liu | ....................... G06F 16/182 |

OTHER PUBLICATIONS

"Skip List," Wikipedia, May 4, 2021, 8 pages, (available at https://en/wikipedia.org//w/index.php?title=Skip_list&oldid=1021413372.

Extended European Search Report issued in European Application No. 22192044.0-1203, mailed Jan. 23, 2023, 9 pages.

Shanmukh: "Schema Patterns—MongoDB—Part 1". Medium, (Available at https://shanu95.medium.com/schema-patterns-mongodb-part-1-16564f1198dc), Jul. 30, 2020, 13 pages.

Summons to attend oral proceedings pursuant to Rule 115(1) EPC issued in European Application No. 22192044.0-1203, mailed Oct. 28, 2024, 13 pages.

Office Action received in corresponding Chinese Patent Application No. 202211035175.7 dated Dec. 25, 2025, 15 pages.

* cited by examiner

FIG. 4

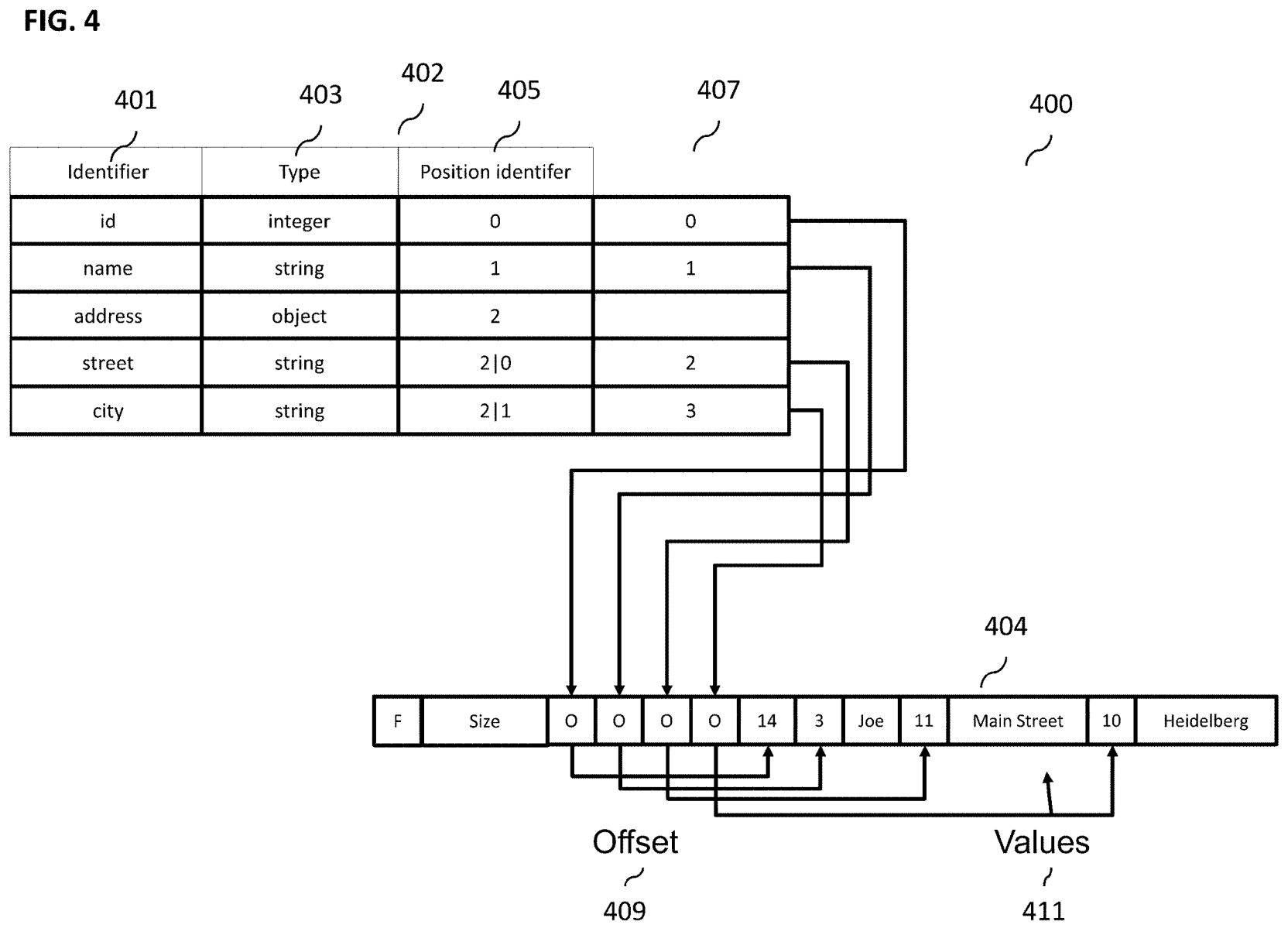

| Identifier | Type | Position identifer |
|---|---|---|
| id | integer | 0 |
| name | string | 1 |
| address | object | 2 |
| street | string | 2\|0 |
| city | string | 2\|1 |

401   403   402   405   407

0
1
2
3

400

404

| F | Size | O | O | O | O | 14 | 3 | Joe | 11 | Main Street | 10 | Heidelberg |
|---|---|---|---|---|---|---|---|---|---|---|---|---|

Offset   409

Values   411

1000

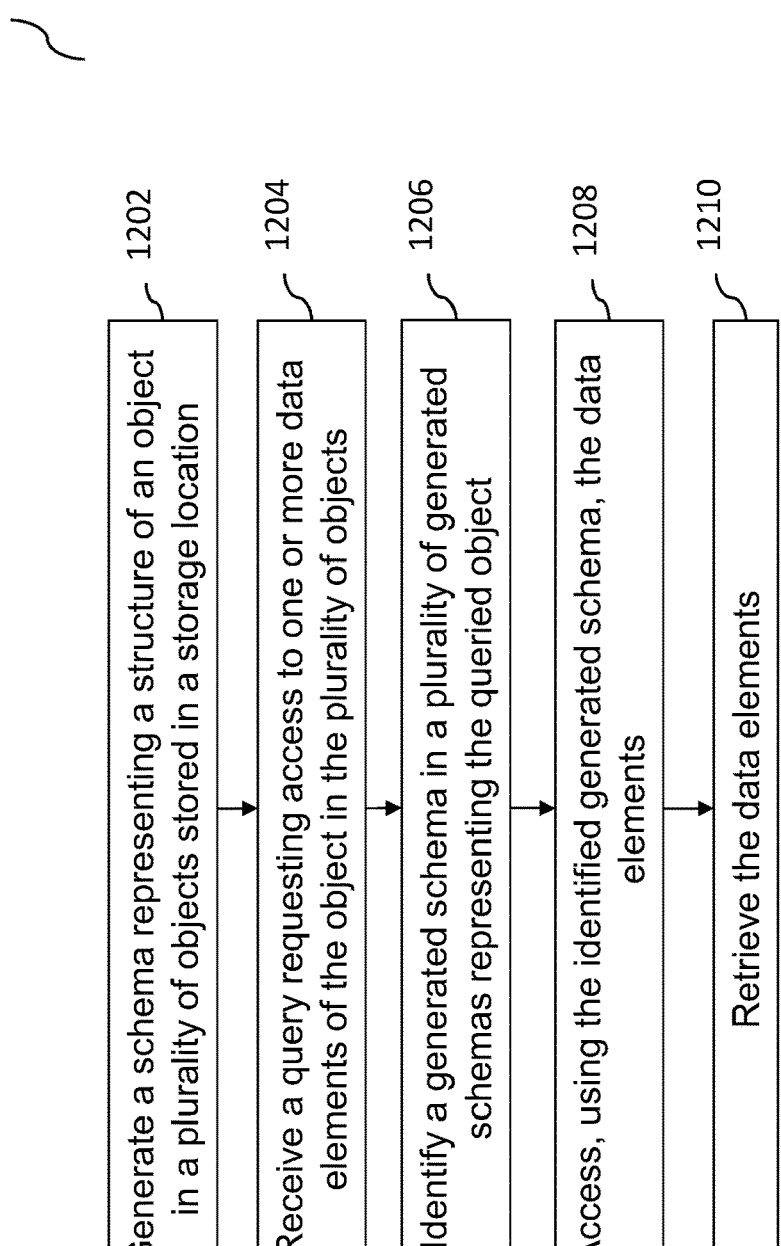

1202 — Generate a schema representing a structure of an object in a plurality of objects stored in a storage location 1204 — Receive a query requesting access to one or more data elements of the object in the plurality of objects 1206 — Identify a generated schema in a plurality of generated schemas representing the queried object 1208 — Access, using the identified generated schema, the data elements 1210 — Retrieve the data elements

USING SELF-MAINTAINING STRUCTURE INFORMATION FOR FASTER DATA ACCESS

TECHNICAL FIELD

This disclosure relates generally to data processing and, in particular, to using structure (e.g., self-maintaining) and/or schema information for faster data access.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Data stored by such systems may be stored using various schemas. Given the complexity of queries, volume of data stored, and/or their volume, the underlying databases face challenges in order to optimize performance.

SUMMARY

In some implementations, the current subject matter relates to a computer implemented method for accessing data. The method may include generating a schema representing a structure of an object in a plurality of objects stored in a storage location. Each object in the plurality of objects may include one or more data elements. Each schema identifying one or more data elements of the object, an offset location of each data element of the object, and a value of each data element of the object. The method may further include receiving a query requesting access to one or more data elements of the object in the plurality of objects, identifying a generated schema in a plurality of generated schemas representing the queried object, accessing, using the identified generated schema, one or more data elements, and retrieving one or more data elements.

In some implementations, the current subject matter can include one or more of the following optional features. In some implementations, the generated schema may be a fixed schema, the fixed schema preventing modification of the schema.

In some implementations, the generated schema may be a mixed schema. The mixed schema may allow modification of the schema. The method may further include adding identification of one or more another data elements of the object, an offset location of each another data element of the object, and a value of each another data element of the object. Accessing the data elements may include accessing another data elements of the object. Retrieval may include retrieving another data elements of the object.

In some implementations, the generated schema may identify one or more skip lists that may permit skipping at least a portion of the one or more data elements during the access and the retrieval, thereby reducing data access times (e.g., yielding logarithmic access times) when retrieving a value for a particular identifier. The schema may identify each skip list using a skip list offset location in the object.

In some implementations, the generated schema may identify an offset location of each data element.

In some implementations, receipt of the query may include generating a query execution plan for the query. At a query compilation time of the received query, an offset location of a first data element in one or more data elements may be determined. The determined offset location of the first data element may be stored in the generated query execution plan. The query execution plan may also be stored. In some implementations, the method may also include receiving another query to access the first data element, and accessing, using the stored query execution plan, the first data element.

In some implementations, the object in the plurality of objects might not include an object schema (e.g., schema-less objects, where one or more portions of the structure object may be populated at a first insertion of data).

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an exemplary fixed structure and/or schema, according to some implementations of the current subject matter;

FIG. 12 is an exemplary method, according to some implementations of the current subject matter.

DETAILED DESCRIPTION

Figure 1:
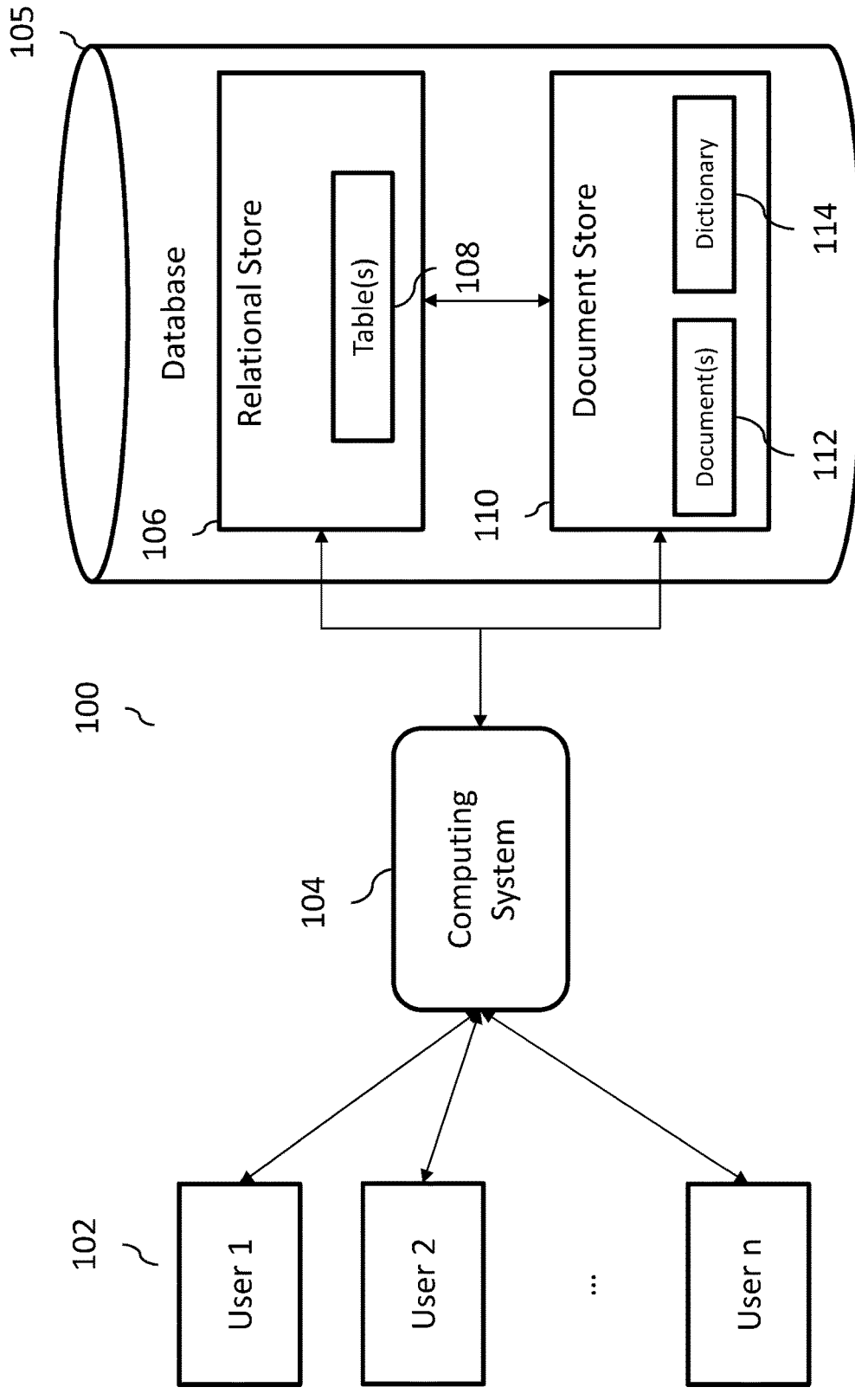
FIG. 1 illustrates an exemplary system for using structure and/or schema information for faster data access, according to some implementations of the current subject matter.

To address these and potentially other deficiencies of currently available solutions, one or more implementations of the current subject matter relate to methods, systems, articles of manufacture, and the like that can, among other possible advantages, provide for an ability to use structure (e.g., self-maintaining) and/or schema information for faster data access in a document store.

Database management systems and operations performed on the data managed by a database management system have become increasingly complex. For example, a database management systems (or database for short) may support relatively complex online analytical processing (OLAP, which may perform multi-dimensional analysis) to more straightforward transaction-based online transaction processing (OLTP). Moreover, the database may be configured as a row store database or column store database, each of which may have certain aspects with respect to queries and other operations at the database. For example, the database may encode data using dictionaries, while some databases may not. In addition to these various databases layer differences, the queries performed at a database may include a complex sequence of operations in order to generate corresponding responses. To implement the complex sequence, a query execution plan (or query plan for short) may be implemented. The query plan may represent a sequence of operations, such as instructions, commands, and/or the like, to access data in the database. The database may also include a query plan optimizer to determine an efficient way to execute the query plan.

From an application or client perspective, it may be extremely cumbersome to access databases. For example, an application may need to query different types of databases using complex queries. As a consequence, the application layer may need to be configured to handle the various types of databases and various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

File storage and/or processing systems may be centralized through the use of one or more servers, which can offload processing and/or storage from client devices accessing the one or more servers. However, although servers may make it easier and/or more convenient for users to store/access data from virtually anywhere, servers may still only have a limited processing and/or storage capacity (e.g., a server or set of servers may only be able to process so many things at one time without degrading performance). Hence, owners/operators of servers may wish to optimize processing procedures performed at the servers. Thus, at least some of the subject matter described herein relates to systems and methods for managing, storing, and/or accessing data in a document store. As used herein, data may refer to semi-structured data, electronic documents such as JSON documents, and/or the like.

Database systems may store data using one or more partitions or slices. A partition in a database may refer to a division of a logical database or its elements into separate independent parts. Partitioning allows improved manageability, performance, load balancing, etc. In some cases, partitions may be distributed over multiple nodes, where each node may allow users to perform various operations (e.g., execution of transactions, etc.) on a partition. Such distribution may increase performance for nodes that may be subject to frequent transactions that may involve retrieval, insertion, modification, generation of views of data, etc. while at the same time maintaining availability and security of data. Data partitioning may be performed by building separate smaller databases, splitting selected elements, etc. Data may be partitioned using horizontal or vertical partitioning methodologies. A horizontal partitioning may place different rows into different tables (e.g., splitting users of different age groups). A vertical partitioning may create new tables having fewer columns and may use additional tables to store any remaining columns.

FIG. 1 illustrates an exemplary system 100 for using structure (e.g., self-maintaining) and/or schema information for a faster access to data stored in a document store, according to some implementations of the current subject matter. The system 100 may include one or more users (user 1, user 2, . . . user n) 102, a computing system 104, and a database system 105, which may include a relational store 106 that may store one or more table(s) 108, and a document store 110 that may store one or more document(s) 112 and/or dictionary(ies) 114. The users 102, the computing system 104, the database system 105, the relational store 106, and/or the document store 110 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Database system 105 may include at least one of the following: databases, storage locations, memory locations, and/or any combination of hardware and/or software components. In some implementations, the database system 105 may be a HANA Database system, as developed by SAP SE, Walldorf, Germany, as will be described below (HANA was previously known as High-Performance Analytic Appliance).

The computing system 104 may include any combination of software and/or hardware components and may be configured to receive and execute a query from one or more users 102 to obtain data in one or more tables 108 in the relational store 106, insert data into one or more tables 108 in the relational store 106, modify data stored in one or more tables 108 in the relational store 106, delete data stored in one or more tables 108 in the relational store 106, generate one or more new tables 108 (e.g., for insertion of new data), etc., and any combination thereof. In some implementations, the computing system 104 (which may include a query execution engine) may be included in the database system 105. Data may be inserted, modified, deleted, etc., new tables may be created, existing tables may be modified, deleted, etc., which may cause modification of an existing data storage structures. In the document store 110, documents (e.g., JSON documents) may be stored using one or more slices. When an amount of data stored in the document store 110 increases, one or more slices may be added to accommodate for storage of additional data.

Execution of a query may typically require generation of a query plan or query execution plan, which may be an ordered set of operations that may be used to access stored data (e.g., access data in a SQL relational database management system). Upon submission of a query to the database system 105, requested data may be retrieved based on parameters of the query. The retrieved data may be aggregated/joined with any other data that may be sought by the user. Insertion, modification, deletion, etc. of data in the database system 105 may be performed using various SQL or other statements.

As stated above, the database system 105, and in particular its relational store 106, may be used to store various data arranged in one or more tables 108. The stored data may be modified, by way of a non-limiting example, through one or more data manipulation language ("DML") processes, which may include one or more operations, including but not limited to, INSERT (e.g., insertion of data into an existing data at a predetermined offset or location), UPDATE (e.g., modification of stored data), and DELETE (e.g., deletion of stored data). Additionally, for example, the stored data may be affected using various data definition language ("DDL") statements, which may include creation of various schema for data storage. In some implementations, the database system 105 may include one or more servers, processors, memory locations, cloud computing components/systems, etc. that may be used for accessing data.

The database table(s) 108 may include at least one column, which may be accessed by the computing system 104. The database table(s) 108 may store any kind of data. For example, the data may include, but is not limited to, definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

Additionally, the computing system 104 may access the document store 110 (also referred to herein as "document storage") that may include any number of documents 112 and/or dictionaries 114 (including zero). The documents 112 may store documents including JSON (JavaScript Object Notation) documents, other structured/semi-structured data, and/or the like. In some implementations, a document may be a binary representation of a JSON document. The one or more dictionaries 114 may include reference values used for the encoding and/or decoding of the documents 112. In some implementations, encoding and decoding may refer to compression and/or decompression of the documents 112.

The computing system 104 may be configured to load a database table 108, document 112, dictionary 114, and/or the like into its main memory. The computing system 104 may be configured to load the information from the database system 105 (e.g., relational store 106 and/or document store 110) to its main memory in response to receipt of a query instantiated by a user 102 and/or computing system through one or more user devices 102, any external software components (not shown in FIG. 1), core software platforms (not shown in FIG. 1), or the like. In some implementations, all/any operational data of the database 106 and/or the document store 110 may reside in-memory (e.g., in random-access memory (RAM)).

In some implementations, the system 100 (and/or any portion thereof) may be implemented as a cloud-based database management system (e.g., not including the user devices 102). A cloud-based database management system may be a hardware and/or software system for receiving, handling, optimizing, and/or executing database system 105 (e.g., relational store 106 and/or document store 110) queries. The database 106 may be a structured, organized collection of data, such as schemas, tables, queries, reports, views, and/or the like, which may be processed for information. The document store 110 may be a structured or partially structured collection of documents, such as JSON documents, other structured/semi-structured data, and/or the like, which may be processed for information.

The database system 105 (e.g., relational store 106 and/or document store 110) may be physically stored in a hardware server or across a plurality of hardware servers. In some implementations, communication may occur between the database system 105 (e.g., relational store 106 and/or the document store 110). A cloud-based database management system may be a hardware and/or software system that interacts with a database, document store, users, and/or other software applications for defining, creating, and/or updating data, for receiving, handling, optimizing, and/or executing database/document store queries, and/or for running applications which utilize a database/document store. Although the database system 105 (including the relational store 106 and/or document store 110) are illustrated as being separate and, at times, described as being separate, in various embodiments, at least a portion of the database system 105 (e.g., relational store 106 and/or the documents store 110) may be combined.

In some implementations, documents stored in the memory of the computing system 104 and/or the document store 110 may be encoded. The computing system 104's memory and/or the document store 110 may include one or more dictionaries for encoding and/or decoding the documents stored in the memory of the computing system 104, the document store 110, etc. For example, during runtime of an application, the computing system 104 may need to access encoded documents in order to run the application, and may access the document store 110 in order to obtain the relevant document(s).

In some cases, documents stored in the document store 110 might not have a schema definition, and thus, when JSON data is stored in a compressed format in the document store, it may be difficult to determine which data fields are being stored (e.g., some fields may be missing and/or vary). Without knowledge of how data is stored (i.e., fields) in the document store, it may be difficult to query/access such data, thereby requiring sequential processing of each data element to determine whether any of them match the requests contained in a query. In some implementations, to provide an efficient access to data stored in the document store, the system 100 may be configured to generate a structure object that may include various data structures (e.g., JSON data structures). The structure object may be updated with new structures upon discovery of such object structures, e.g., through executions of various queries, proactively searching the document store, such as, for example, during the insertion of new documents, etc. The following discussion will refer to JSON objects, however, as can be understood, any types of objects may be used to generate a structure object, in accordance with various implementations of the current subject matter, as discussed herein.

Figure 2:
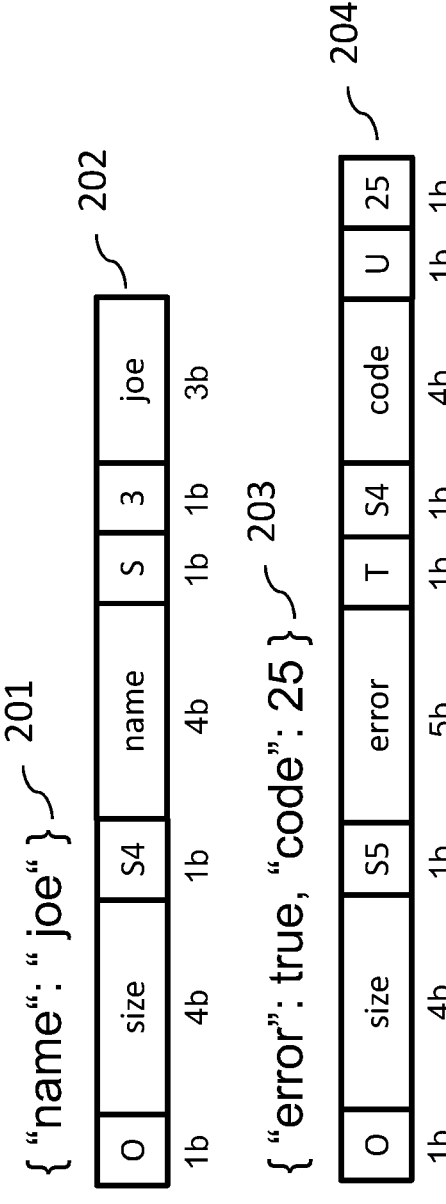
FIG. 2 illustrates an exemplary JSON binary representation schemas of objects.

FIG. 2 illustrates an exemplary binary representation 202, 204 of JSON objects. For example, an object 201 {"name": "joe"} has a binary representation 202. The structure of the binary representation 202 (the size of which is 15 bytes in an exemplary implementation) includes character strings "name" and "joe" that are each accorded a predetermined number of bytes, i.e., 4 bytes, and 3 bytes, respectively. The fields are separated by 1-byte fields identifying the subsequent strings (i.e., "S4", "S", "3"). An object identifier ("O") may also be accorded a 1-byte field. Similarly, an object 203 {"error": true, "code": 25} has a binary representation 204. Here, the structure has a size of 19 bytes and includes a 5-byte field containing a string "error" (preceded by 1 byte field "S5" indicative of the size of the string "error"), a Boolean value "T" corresponding to the "error" string, and "code" and code value fields ("U" for "unsigned integer" and "25" as the actual value).

When an object 201, for example, is queried, the computing system 104 may be configured to perform a search for a field "name" and determine its position in the corresponding binary representation 202. The system 104 may also perform an appropriate comparison to determine whether the value of the name is present.

In some cases, a dictionary compression may be applied to data stored in the document store. For example, in the following string

```
{
    "name": "Joe",
    "age": 25,
    "hobbies": ["soccer", "swimming"],
    "address": {"street":
        "4 Pennsylvania Plaza",
        "city": "New York"
    }
}
``` its compressed version may be as follows:

```
{
    0: "Joe", 0 name
    1: 25, 1 age
    2: ["soccer", "swimming"], 2 hobbies
    3: {3 address
        4: "4 Pennsylvania Plaza", 4 street
        5: "New York" 5 city
    }
}
```

Figure 3:
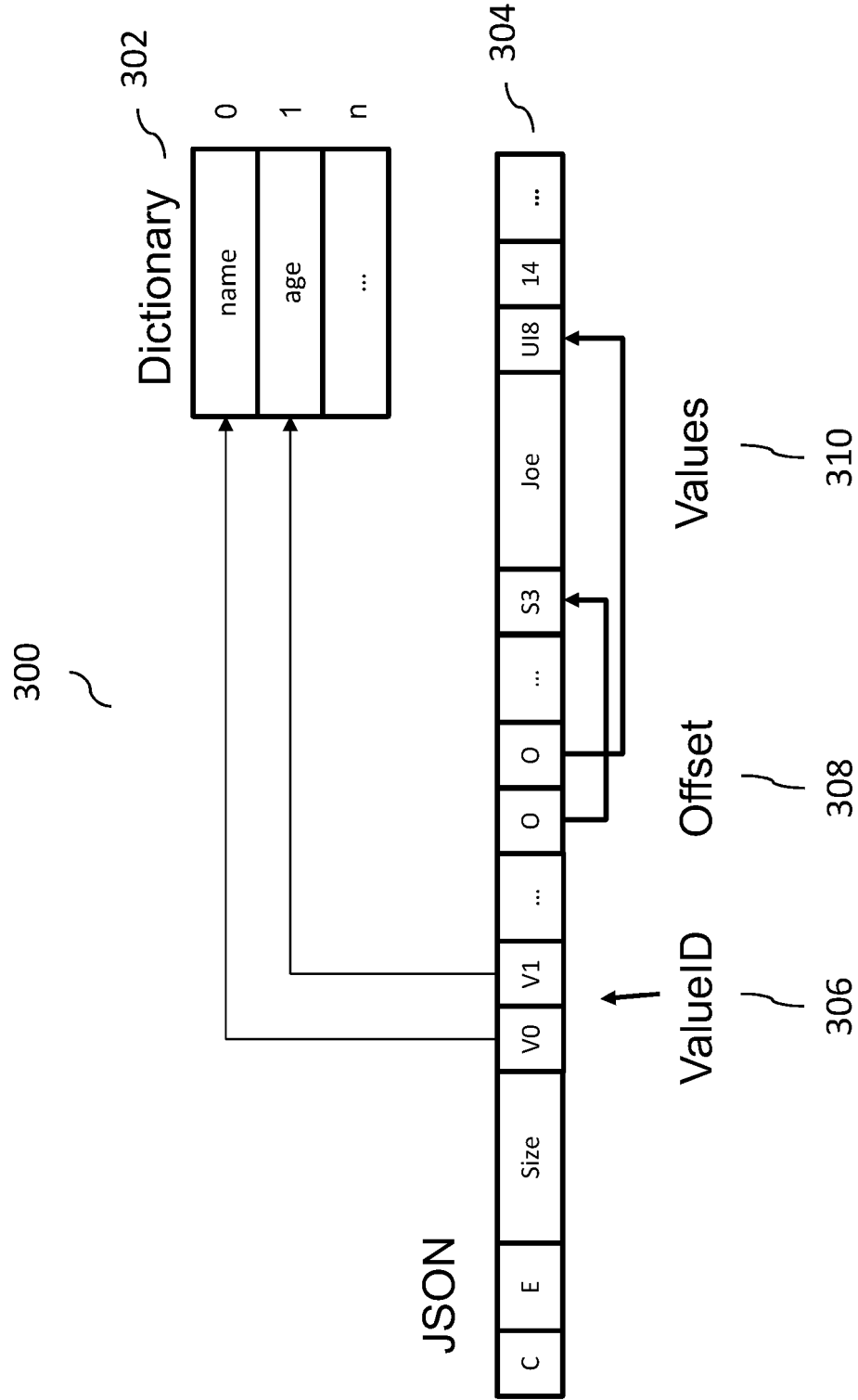
FIG. 3 illustrates an exemplary binary representation of a compressed JSON document.

FIG. 3 illustrates an exemplary binary representation 300 of a compressed JSON document. For example, the binary representation 300 may be of the following string that may be compressed using dictionary 302:

```
{
    name: "Joe",
    age: 14,
    . . .
}
```

The dictionary 302 may include entries for value identifiers (ValueID) "0" for strings "name", "1" for "age", etc. Because of the dictionary compression, the binary representation 304 may include fields 306 that correspond to ValueID V0, V1 and fields 308 that correspond to offset positions ("O"), which may be followed by the string values fields 310. As shown in FIG. 3, the binary representation 304 has a linear form. However, complexities associated with querying may increase once the stored document has nested data structures or arrays. The current subject matter's structure object may be configured to resolve complexities that may be associated with querying data stored using various types or schemas.

The document store 110 (as shown in FIG. 1) may be configured to store documents using a particular schema. The schema, for example, may be fixed, which may require all documents to adhere to that fixed predetermined schema. For instance, a fixed schema may be as follows:

```
CREATE COLLECTION WITH FIXED SCHEMA ({
    "id": "integer",
    "name": "string",
    "address": {
        "street": "string",
        "city": "string"
    }
});
```

FIG. 4 illustrates an exemplary fixed structure and/or schema 400, according to some implementations of the current subject matter. The fixed structure and/or schema 400 may be generated using the above CREATE statement. For ease of access to the document, the computing system 104 may be configured to generate a structure object 402 that may be mapped to a binary representation 404 and may be used for the purposes of querying, searching for data, inserting data, modifying data, deleting data, etc.

The structure object 402 may be configured to include an "identifier" column 401, a "type" column 403, a "position identifier" column 405 (e.g., in the CREATE statement above, "id" is at "0" position identifier level, "name"—at "1" position identifier level, "address"—at "2" level, and "street" and "city" are at position identifier sublevels "2|0" and "2|1", respectively) and an offset value 407 column. For example, identifier "name" corresponds to type (or object type) "string", position identifier value of "1", and offset position of "1". At query compile time, the following statement (e.g., by performing a lookup of an identifier) WHERE "name"="Paul"→"name" may be mapped to 1 at the query compilation time (e.g., cached and then re-used during subsequent query execution times).

As shown by the arrows in FIG. 4, the values in the structure object 402 may be mapped to the binary representation 404. In particular, each row of the structure object 402 may be mapped to a predetermined offset field 409, which, in turn, may be mapped to a predetermined value field 411.

Alternatively, documents may be stored in the documents tore 110 using a mixed schema. This means, for example, that documents may be stored with additional fields at all hierarchical levels, such as using, the following:

```
CREATE COLLECTION WITH MIXED SCHEMA
    "id": "integer",
    "name": "string",
    "address": {
        "street": "string",
        "city": "string"
    }
});
```

In some cases, an additional value may need to be added to the above document collection (which might not be permissible if a fixed schema is used for storage of documents). The following statement may be used, for example, to insert "age" value:

```
INSERT INTO myCollection VALUES({
    "id": 14,
    "name": "Joe",
    "address": {
        "street": "Main Street",
```

Figure 5:
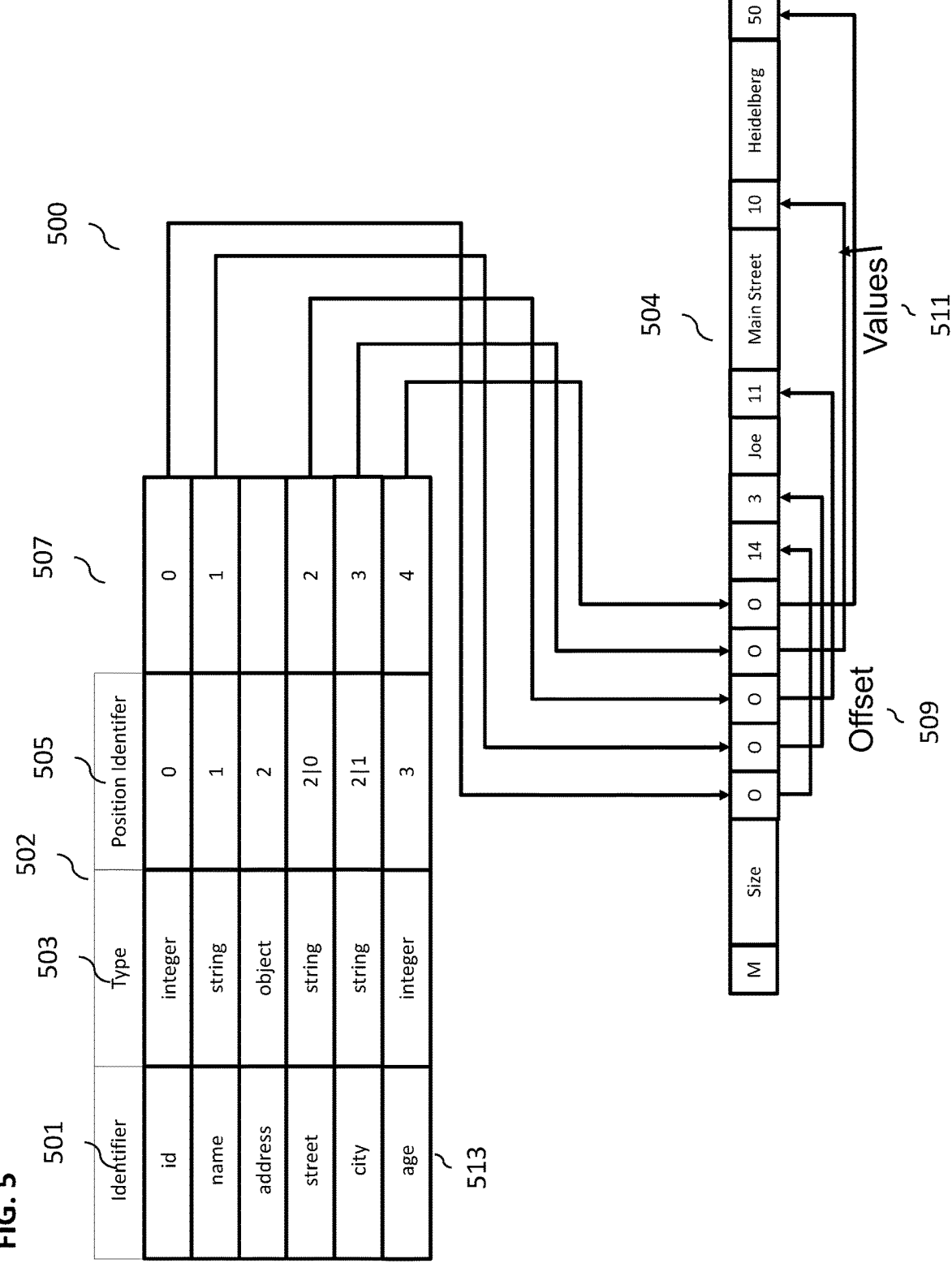
FIG. 5 illustrates an exemplary mixed document storage structure and/or schema, according to some implementations of the current subject matter.

"city": "Heidelberg"
},
"age": 50
});

FIG. 5 illustrates an exemplary mixed document storage structure and/or schema 500, according to some implementations of the current subject matter. The mixed structure and/or schema 500 may be generated using the above CREATE statement. Additionally, an INSERT statement may be added to include additional values (e.g., "age"). Similar to the fixed structure and/or schema shown in FIG. 4, the computing system 104 may generate a structure object 502 that may be mapped to a binary representation 504 and may be used for the purposes of querying, searching for data, inserting data, modifying data, deleting data, etc.

Again similar to the fixed schema structure object 402 shown in FIG. 4, the structure object 502 may include an "identifier" column 501, a "type" column 503, a "position identifier" column 505 (e.g., in the CREATE statement above, "id" is at "0" position identifier level, "name"—at "1" position identifier level, "address"—at "2" level, and "street" and "city" are at position identifier sublevels "2|0" and "2|1", respectively) and an offset value 507 column. Because this is a mixed schema, an additional row 513 may be added to the structure object that may be used to insert "age" values corresponding to the INSERT statement above. In this case, the "age" position identifier level may be 3 and its offset position—4. As shown in FIG. 5, the field "age" is only encountered for a single document so far. However, this field causes extension of a structure object used for all documents in a particular collection of JSON documents, and/or a particular partition. The extended structure object determines a position of the value of the newly inserted field in the compressed binary JSON representation. All subsequently inserted documents will re-use the above structure object and the binary representation may be generated accordingly.

As shown by the arrows in FIG. 5, the values in the structure object 502 may be mapped to the binary representation 504. In particular, each row of the structure object 502 may be mapped to a predetermined offset field 509, which, in turn, may be mapped to a predetermined value field 511. With regard to inserted value of "age" (i.e., "50"), it may be positioned in the binary representation 504 after the string "Heidelberg" corresponding to the "city".

Figure 6:
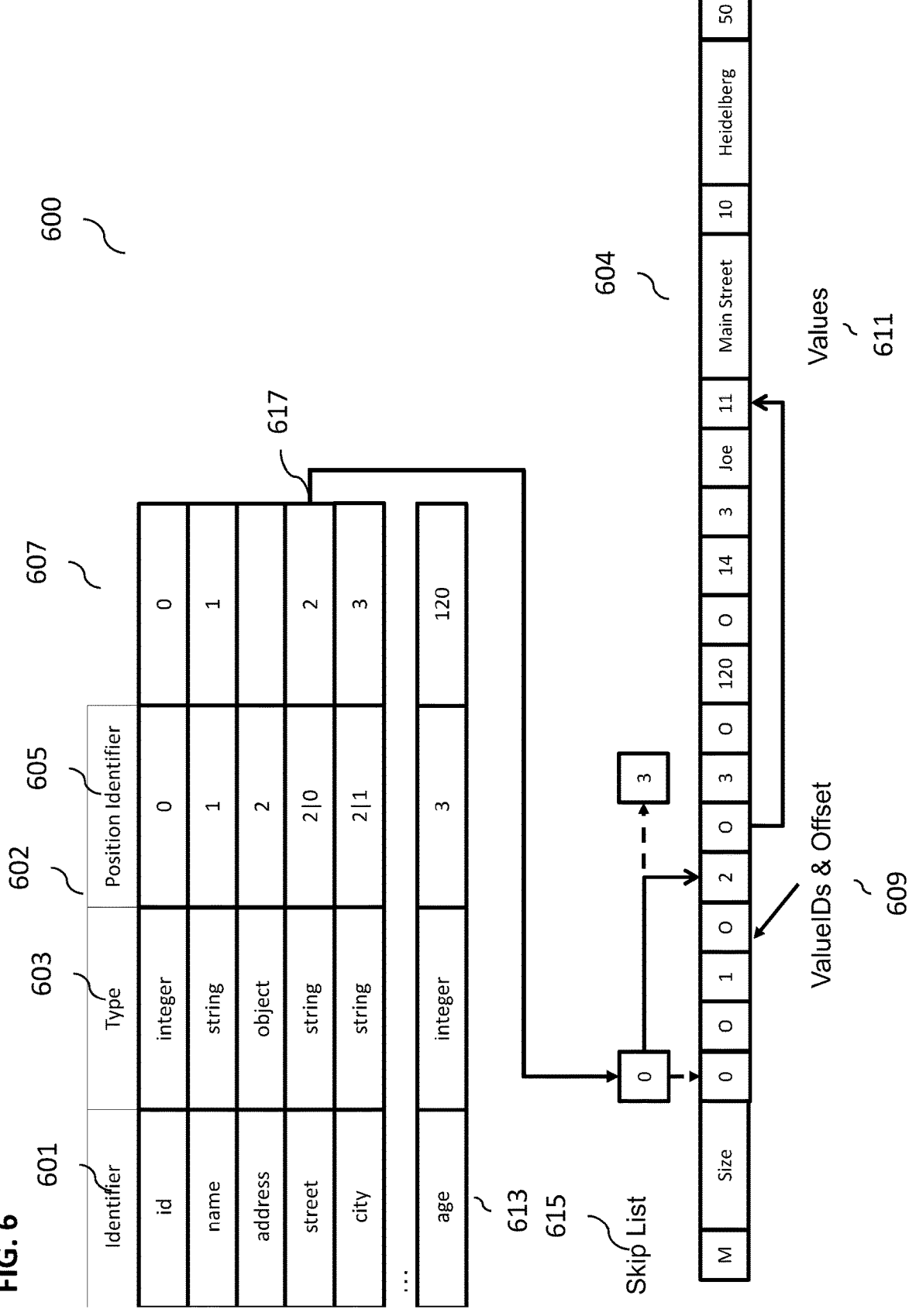
FIG. 6 illustrates another exemplary mixed document storage structure and/or schema, according to some implementations of the current subject matter.

FIG. 6 illustrates another exemplary mixed document storage structure and/or schema 600, according to some implementations of the current subject matter. The mixed structure and/or schema 600 may be generated using the above CREATE and INSERT statements, where the INSERT statement may be added to include additional values (e.g., "age"). Similar to the mixed structure and/or schema shown in FIG. 5, the computing system 104 may generate a structure object 602 that may be mapped to a binary representation 604 and may be used for the purposes of querying, searching for data, inserting data, modifying data, deleting data, etc. As shown in FIG. 6, the structure object 602 may be configured to include multiple rows with multiple identifiers. For example, the structure object 602 may include an "identifier" column 601, a "type" column 603, a "position identifier" column 605 (e.g., in the CREATE statement above, "id" is at "0" position identifier level, "name"—at "1" position identifier level, "address"—at "2" level, and "street" and "city" are at position identifier sublevels "2|0" and "2|1", respectively) and an offset value 607 column. Because there are multiple rows in the mixed structure and/or schema 600, a row 613, for example, may include "age" values corresponding to the INSERT statement above, where the "age" position identifier level may be 3 and its offset position—120. The structure and/or schema 600 may be configured to address a situation where addition of many inserts may significantly extend the structure object over time, thereby wasting memory space, such as in an exemplary situation, where all newly inserted/created documents would need to provide for a space to store many offsets for values that do not exist. For instance, assuming that a document is inserted/created that only includes the identifiers 601 shown in FIG. 6, where offset values 607 "4" to "119" are not used, however, it will be necessary to create a reserve space for offset values "4" to "119" and store an "not present" and/or "null" flags in it, thus, wasting memory.

As such, in some implementations, the binary representation 604 corresponding to the structure object 602 may be configured to use one or more skip lists 615 to avoid such memory waste. A skip list may be referred to as a probabilistic data structure and may be used to store a sorted list of elements and/or data with a linked list. Using a skip list, the computing system 104, in a single step, may skip several elements of the entire list. The skip list may allow quickly searching, removing, and/or inserting elements. The skip list may include a base list that includes a set of elements which maintains the link hierarchy of the subsequent elements. A lower layer of the skip list may include a common sorted linked list, and one or more of its top layers may be used to skip elements during processing (e.g., searching, querying, etc.), thereby removing the need to reserve a space for offset values that are not used in a particular document.

As shown by the arrows in FIG. 6, the values in the structure object 602 may be mapped to the binary representation 604. In this case, the skip list 615 may be used in connection with the "street" row 617. The skip list 615 may be configured to allowing skipping multiple rows that may exist in the object 602, e.g., between the row 617 ("street") and row 613 ("age") to get directly to data contained in the binary representation 604 related to the value 611 corresponding to the "street" (i.e., to reach offset position "2", the current subject matter system may be configured to search the skip list and find 0 and 3. As the searched value 2 is between 0 and 3, the current subject matter system may follow a pointer of 0 to go through the "lower-level" data structure. A substantial performance gain may be realized for large documents that may include a multi-level skip list, as there can be a gain with an algorithm of logarithmic complexity), which in this case is "Main Street" (as indicated in the binary representation 604). While the binary representation 604 may still be mapped to each row of the structure object 602, as shown in FIG. 6, when searching for a specific value (e.g., as may be requested by a query, inserting a new value, deleting a value, modifying a value, etc.), certain values may be skipped using the skip list 615, and data may be obtained (or inserted, deleted, modified, etc.) by going directly to the offset position requested in the query.

Figure 7:
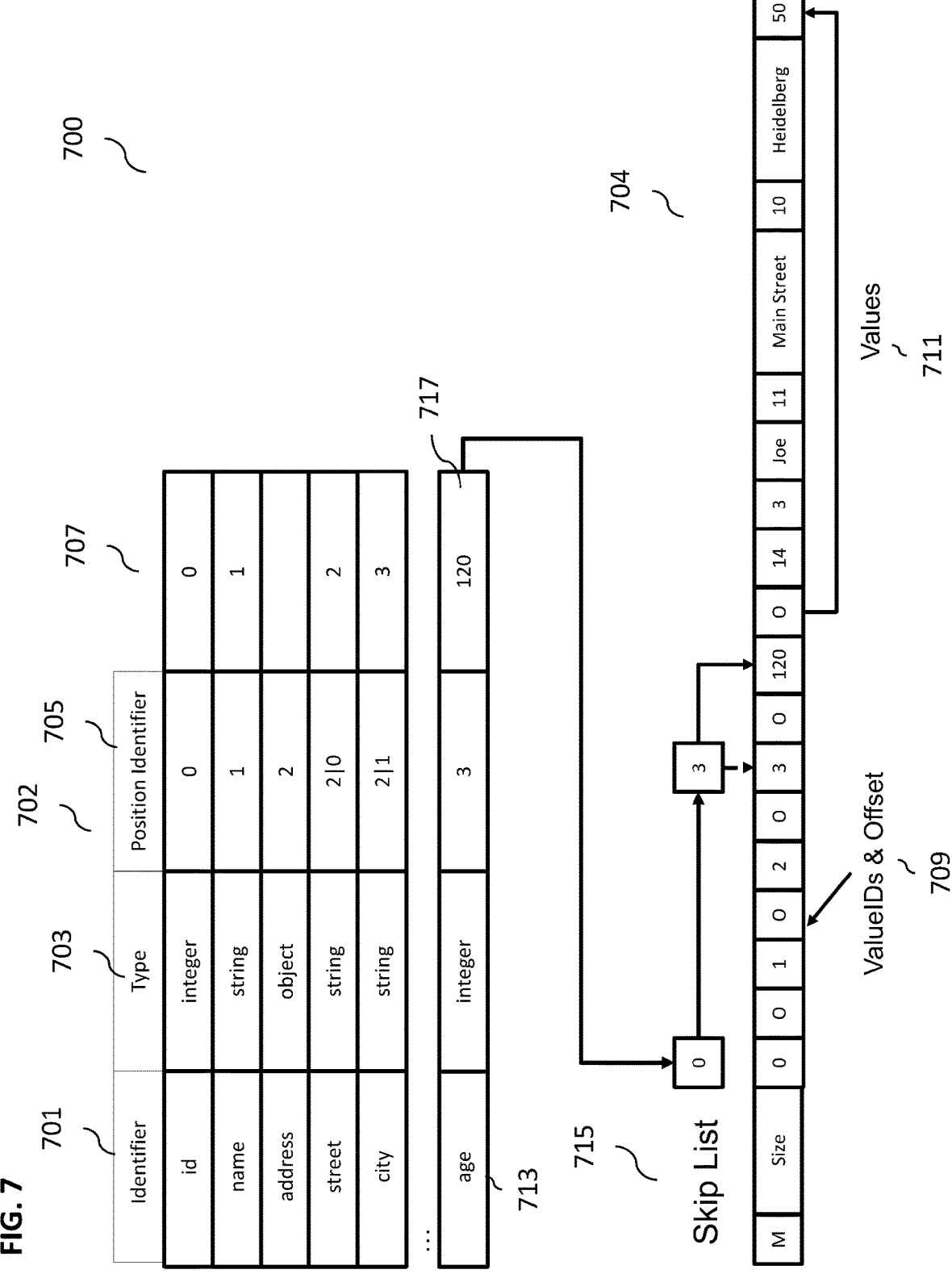
FIG. 7 illustrates another exemplary mixed document storage structure and/or schema that implements a skip list, according to some implementations of the current subject matter.

FIG. 7 illustrates another exemplary mixed document storage structure and/or schema 700 that implements a skip list, according to some implementations of the current subject matter. The mixed structure and/or schema 700 may be generated using the above CREATE and INSERT statements, where the INSERT statement may be added to include additional values (e.g., "age"). Similar to the mixed structure and/or schema shown in FIG. 6, the computing system 104 may generate a structure object 702 that may be mapped to a binary representation 704 and may be used for the purposes of querying, searching for data, inserting data, modifying data, deleting data, etc. As shown in FIG. 7, similar to FIG. 6, the structure object 702 may be configured to include multiple rows with multiple identifiers. The binary representation 704 corresponding to the structure object 702 may be configured to use one or more skip lists 715. In this case, the skip list 715 is used to skip all rows in the object 702 to directly go to the last row 713 ("age") that has an offset position 717 120 in the binary representation 704. Here, similar to FIG. 6, the processing of the object 702 and the binary representation 704 may start at the beginning of the binary representation (position "0"). The skip list 715 may then be detected (allowing bypassing positions "1" and "2". Position "3", i.e., "city", may be the last position before "age" (or any other values) may need to be skipped, at which point the skip list 715 may be used to go directly to the offset position 709 "120" corresponding to the "age", which may point to the value 711 "50".

Figure 8:
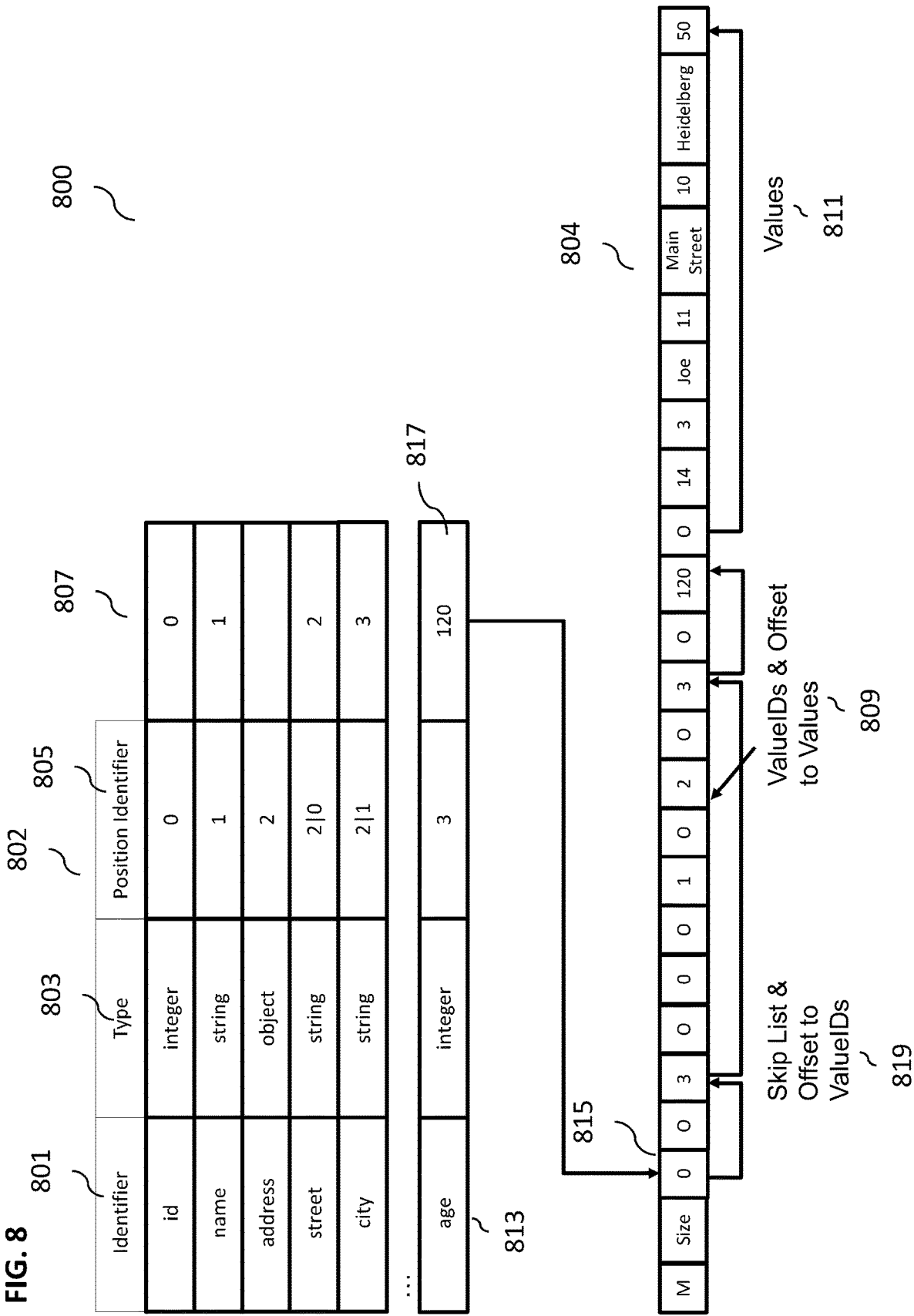
FIG. 8 illustrates another exemplary mixed document storage structure and/or schema that implements a skip list incorporated into a binary representation, according to some implementations of the current subject matter.

In some implementations, the skip list may be incorporated into the binary representation of data. FIG. 8 illustrates another exemplary mixed document storage structure and/or schema 800 that implements a skip list incorporated into a binary representation, according to some implementations of the current subject matter. The mixed structure and/or schema 800 may be generated using the above CREATE and INSERT statements discussed above. Similar to the mixed structures and/or schemas shown in FIGS. 5-7, the computing system 104 may generate a structure object 802 that may be mapped to a binary representation 804 and may be used for the purposes of querying, searching for data, inserting data, modifying data, deleting data, etc.

The structure object 802 may include multiple rows with multiple identifiers. The binary representation 804 corresponding to the structure object 802 may use one or more skip lists 815, where the skip list 815 may be incorporated into the binary representation 804. Similar to FIG. 7, the skip list 815 may be used to skip all rows in the object 802 to directly go to the last row 813 ("age") that has an offset position 817 120 in the binary representation 804.

As shown in FIG. 8, the skip list 815 may be inserted prior to the rest of the data represented in the structure object 802. Thus, the processing of the object 802 and the binary representation 804 may detect that a skip list is present at the beginning 819 of the binary representation (position "0"). Once the skip list 815 is detected, the system 104 may be configured to bypass positions "1", "2" and "3" and go directly to the offset position 809 "120" corresponding to the "age", which may point to the value 811 "50".

In some implementations, the current subject matter system may be used with or without schema for document collections of data. In particular, the current subject matter's structure objects (e.g., structure objects shown in FIGS. 4-8) may be used for document collections without schema. In this case, the fixed portion of the structure object (e.g., as shown in FIG. 4) may be empty and may be populated with data with receiving a first insertion of data/documents.

In some implementations, the current subject matter can be implemented in various in-memory database systems, such as the HANA Database system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 9:
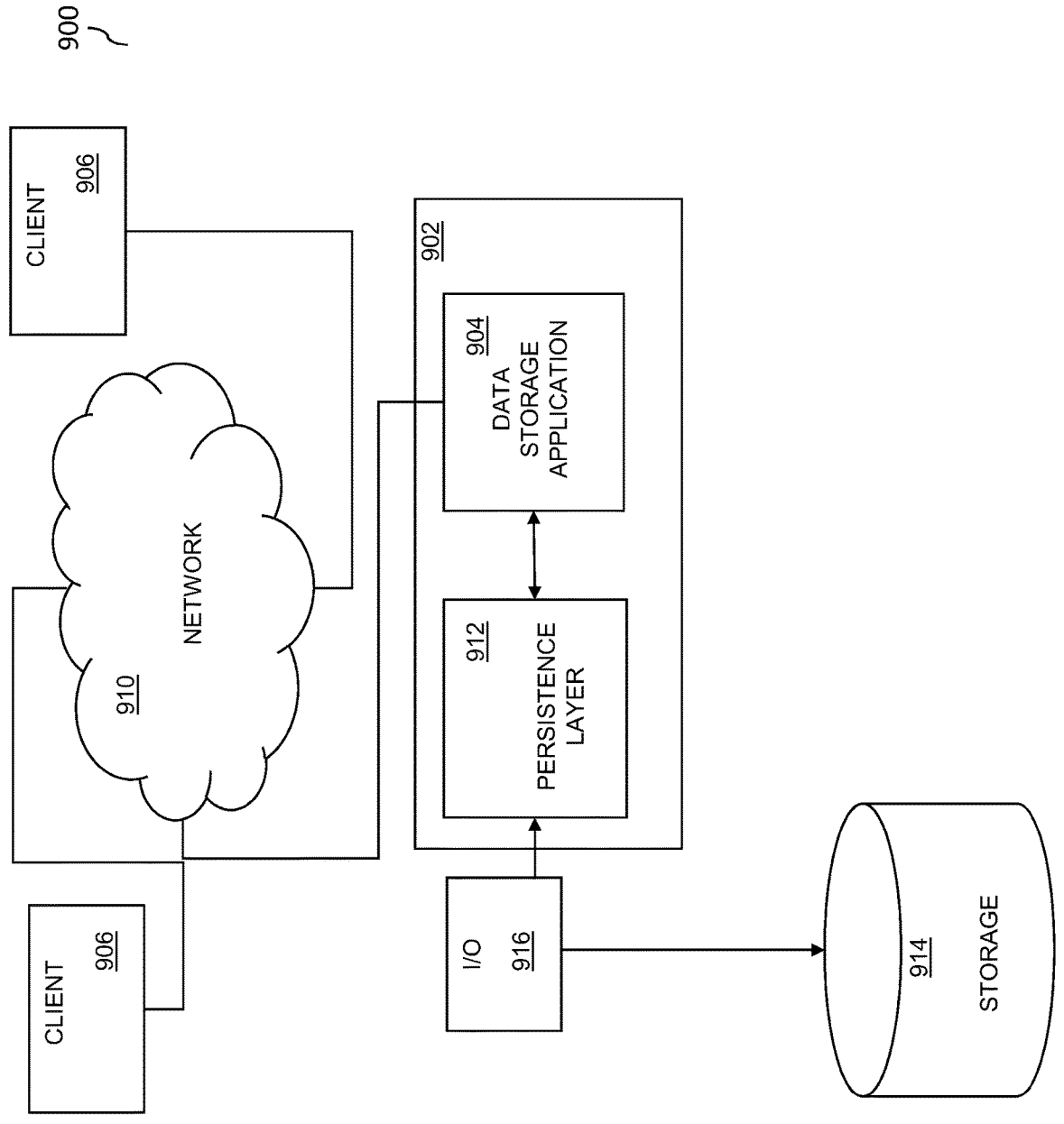
FIG. 9 is a diagram illustrating an exemplary system including a data storage application, according to some implementations of the current subject matter.

FIG. 9 illustrates an exemplary system 900 in which a computing system 902, which can include one or more programmable processors that can be collocated, linked over one or more networks, etc., executes one or more modules, software components, or the like of a data storage application 904, according to some implementations of the current subject matter. The data storage application 904 can include one or more of a database, an enterprise resource program, a distributed storage system (e.g. NetApp Filer available from NetApp of Sunnyvale, CA), or the like.

The one or more modules, software components, or the like can be accessible to local users of the computing system 902 as well as to remote users accessing the computing system 902 from one or more client machines 906 over a network connection 910. One or more user interface screens produced by the one or more first modules can be displayed to a user, either via a local display or via a display associated with one of the client machines 906. Data units of the data storage application 904 can be transiently stored in a persistence layer 912 (e.g., a page buffer or other type of temporary persistency layer), which can write the data, in the form of storage pages, to one or more storages 914, for example via an input/output component 916. The one or more storages 914 can include one or more physical storage media or devices (e.g. hard disk drives, persistent flash memory, random access memory, optical media, magnetic media, and the like) configured for writing data for longer term storage. It should be noted that the storage 914 and the input/output component 916 can be included in the computing system 902 despite their being shown as external to the computing system 902 in FIG. 9.

Data retained at the longer-term storage 914 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 10:
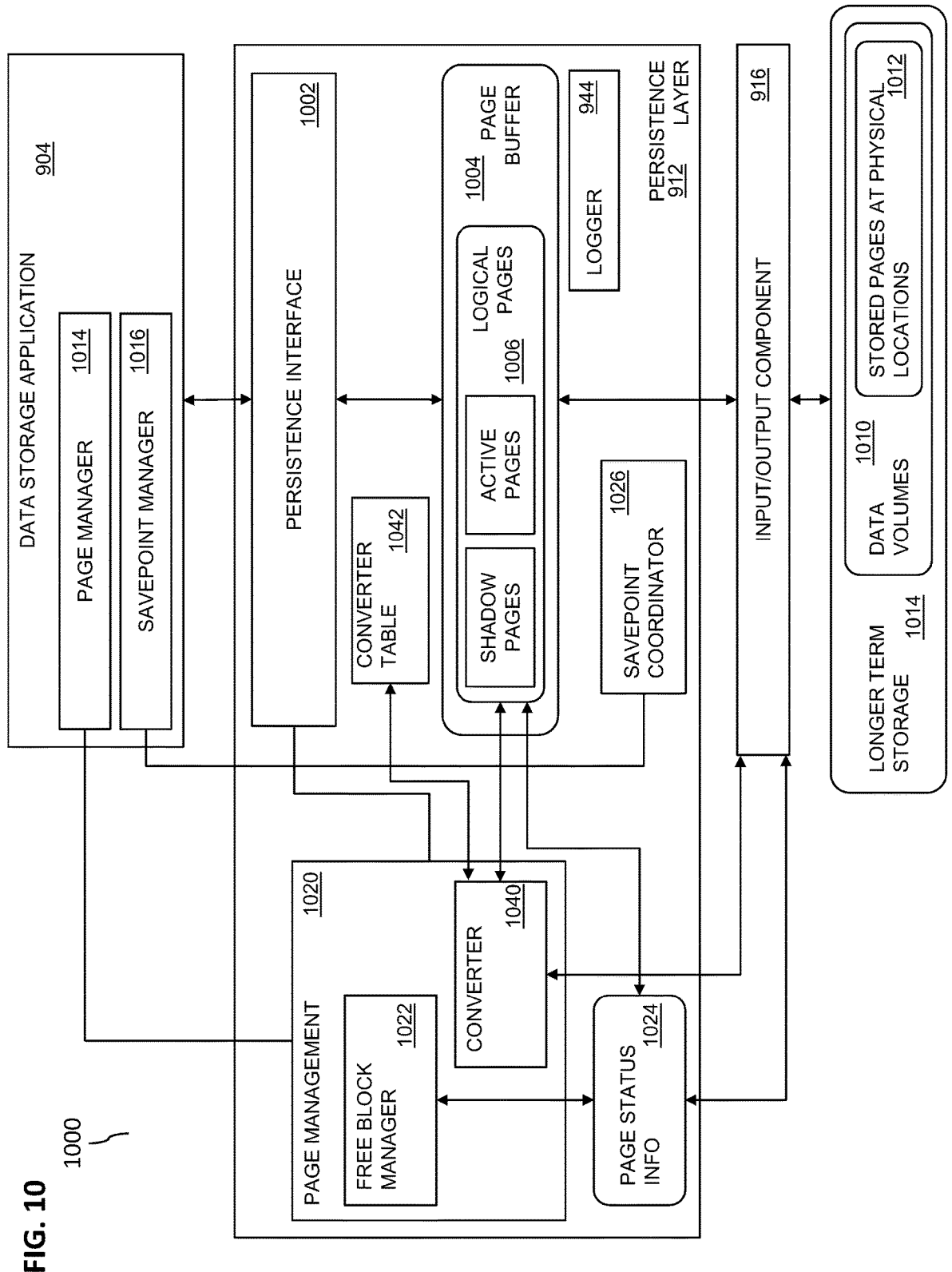
FIG. 10 is a diagram illustrating details of the system of FIG. 9.

FIG. 10 illustrates exemplary software architecture 1000, according to some implementations of the current subject matter. A data storage application 904, which can be implemented in one or more of hardware and software, can include one or more of a database application, a network-attached storage system, or the like. According to at least some implementations of the current subject matter, such a data storage application 904 can include or otherwise interface with a persistence layer 912 or other type of memory buffer, for example via a persistence interface 1002. A page buffer 1004 within the persistence layer 912 can store one or more logical pages 1006, and optionally can include shadow pages, active pages, and the like. The logical pages 1006 retained in the persistence layer 912 can be written to a storage (e.g. a longer term storage, etc.) 914 via an input/output component 916, which can be a software module, a sub-system implemented in one or more of software and hardware, or the like. The storage 914 can include one or more data volumes 1010 where stored pages 1012 are allocated at physical memory blocks.

In some implementations, the data storage application 904 can include or be otherwise in communication with a page manager 1014 and/or a savepoint manager 1016. The page manager 1014 can communicate with a page management module 1020 at the persistence layer 912 that can include a free block manager 1022 that monitors page status information 1024, for example the status of physical pages within the storage 914 and logical pages in the persistence layer 912

(and optionally in the page buffer 1004). The savepoint manager 1016 can communicate with a savepoint coordinator 1026 at the persistence layer 912 to handle savepoints, which are used to create a consistent persistent state of the database for restart after a possible crash.

In some implementations of a data storage application 904, the page management module of the persistence layer 912 can implement a shadow paging. The free block manager 1022 within the page management module 1020 can maintain the status of physical pages. The page buffer 1004 can include a fixed page status buffer that operates as discussed herein. A converter component 1040, which can be part of or in communication with the page management module 1020, can be responsible for mapping between logical and physical pages written to the storage 914. The converter 1040 can maintain the current mapping of logical pages to the corresponding physical pages in a converter table 1042. The converter 1040 can maintain a current mapping of logical pages 1006 to the corresponding physical pages in one or more converter tables 1042. When a logical page 1006 is read from storage 914, the storage page to be loaded can be looked up from the one or more converter tables 1042 using the converter 1040. When a logical page is written to storage 914 the first time after a savepoint, a new free physical page is assigned to the logical page. The free block manager 1022 marks the new physical page as "used" and the new mapping is stored in the one or more converter tables 1042.

The persistence layer 912 can ensure that changes made in the data storage application 904 are durable and that the data storage application 904 can be restored to a most recent committed state after a restart. Writing data to the storage 914 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 1044 can also be included to store the changes made to the data of the data storage application in a linear log. The logger component 1044 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 1044 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 912 can use a combination of undo log entries (from one or more logs) and shadow paging.

The persistence interface 1002 can handle read and write requests of stores (e.g., in-memory stores, etc.). The persistence interface 1002 can also provide write methods for writing data both with logging and without logging. If the logged write operations are used, the persistence interface 1002 invokes the logger 1044. In addition, the logger 1044 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1044. For an entry of type "update", for example, this would be the identification of the affected record and the after image of the modified data.

When the data application 904 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 1044 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 1044 can write a database log (or simply referred to herein as a "log") sequentially into a memory buffer in natural order (e.g., sequential order, etc.). If several physical hard disks/storage devices are used to store log data, several log partitions can be defined. Thereafter, the logger 1044 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 904 can use shadow paging so that the savepoint manager 1016 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 11:
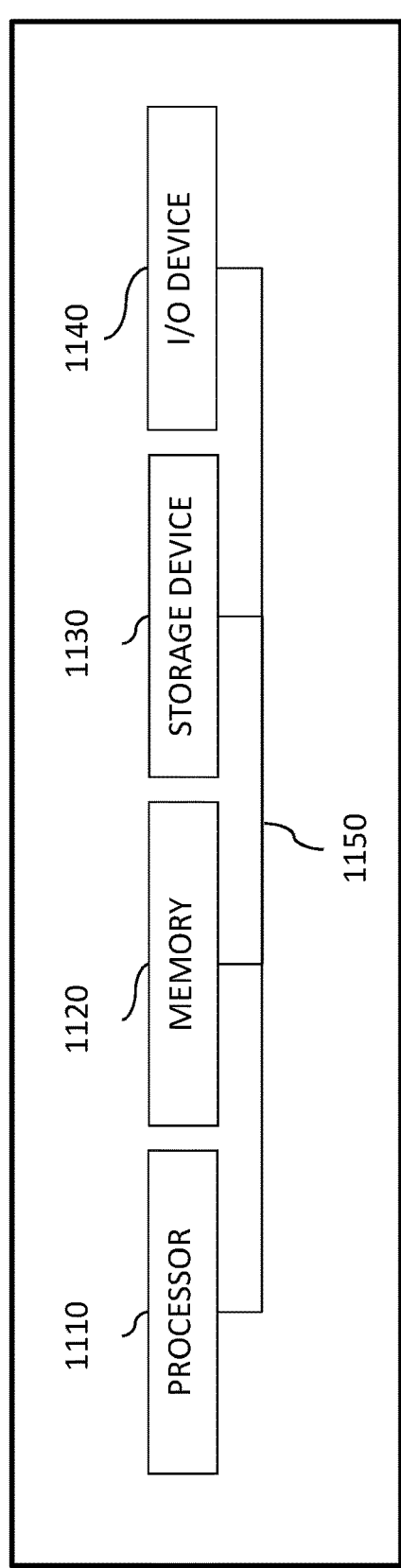
FIG. 11 is an exemplary system, according to some implementations of the current subject matter.

In some implementations, the current subject matter can be configured to be implemented in a system 1100, as shown in FIG. 11. The system 1100 can include a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 1100. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

FIG. 12 illustrates an exemplary method 1200 for accessing data using a schema, according to some implementations of the current subject matter. The method 1200 may be executed by the system 100 shown in FIG. 1. At 1202, a schema representing a structure of an object in a plurality of objects stored in a storage location (e.g., document store 110 as shown in FIG. 1) may be generated. The objects may be various data, documents, etc. Such objects may have a binary representation, such as the one shown in FIG. 2. Example schemas (e.g., structure objects 401, 501, 601, 701, 801) are illustrated in FIGS. 4-8. Each object in the plurality of objects may include one or more data elements (e.g., "name", "address", etc.). Each schema may identify one or more data elements of the object, an offset location (e.g., 409, 509, etc.) of each data element of the object, and a value of each data element (e.g., 411, 511, etc.) of the object.

At 1204, a query requesting access to one or more data elements of the object in the plurality of objects may be received by the computing system 104. The computing system 104 may identify a generated schema in a plurality of generated schemas that may represent the queried object, at 1206. Using the identified generated schema, the computing system 104 may then access the data elements being sought, at 1208, and retrieve them, at 1210.

In some implementations, the current subject matter can include one or more of the following optional features. In some implementations, the generated schema may be a fixed schema (e.g., as shown in FIG. 4), the fixed schema preventing modification of the schema.

In some implementations, the generated schema may be a mixed schema. The mixed schema may allow modification of the schema. The method 1200 may further include adding identification of one or more another data elements (e.g., "age") of the object, an offset location of each another data element of the object, and a value of each another data element of the object. Accessing the data elements may include accessing another data elements of the object. Retrieval may include retrieving another data elements of the object.

In some implementations, the generated schema may identify one or more skip lists (e.g., skip lists 615, 715, etc., as shown in FIGS. 6-7) that may permit skipping at least a portion of the one or more data elements during the access and the retrieval, thereby reducing data access times (e.g., yielding logarithmic access times) when retrieving a value for a particular identifier. The schema may identify each skip list using a skip list offset location in the object.

In some implementations, the generated schema may identify an offset location (e.g., position identifier 405, 505, 605, 705, 805) of each data element.

In some implementations, receipt of the query may include generating a query execution plan for the query. At a query compilation time of the received query, an offset location of a first data element in one or more data elements may be determined. The determined offset location of the first data element may be stored in the generated query execution plan. The query execution plan may also be stored (e.g., by the system 100 shown in FIG. 1). In some implementations, the method may also include receiving another query to access the first data element, and accessing, using the stored query execution plan, the first data element.

In some implementations, the object in the plurality of objects might not include an object schema (e.g., schemaless objects, where one or more portions of the structure object may be populated at a first insertion of data).

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

generating a schema representing a structure of an object in a plurality of objects stored in a storage location, each object in the plurality of objects including one or more data elements, the schema identifying, for the object in the plurality of objects, one or more data elements of the object, an offset location of each of the one or more data elements of the object, and a value of each of the one or more data elements of the object;

receiving a query requesting access to at least one of the one or more data elements of the object in the plurality of objects;

identifying a generated schema in a plurality of generated schemas representing the object;

mapping the identified generated schema to a binary representation of the structure of the object, such that each row in the schema is mapped to an offset field in the binary representation, and each offset field is mapped to a value field in the binary representation;

accessing, using the binary representation of the structure of the object mapped to the identified generated schema, the one or more data elements of the object in the plurality of objects; and retrieving the one or more data elements of the object in the plurality of objects, wherein the generated schema identifies, using a skip list offset location in the object, one or more skip lists permitting skipping at least a portion of the one or more data elements of the object during the accessing and the retrieving, wherein the one or more skip lists are incorporated into a beginning of the binary representation of the structure of the object.

2. The method according to claim 1, wherein the generated schema is a fixed schema, the fixed schema preventing modification of the schema.

3. The method according to claim 1, wherein the generated schema is a mixed schema, the mixed schema allowing modification of the schema.

4. The method according to claim 3, further comprising adding identification of one or more another data elements of the object, an offset location of each another data element of the object, and a value of each another data element of the object.

5. The method according to claim 4, wherein the accessing includes accessing the one or more another data elements of the object, and the retrieving includes retrieving the one or more another data elements of the object.

6. The method according to claim 1, wherein the generated schema identifies one or more offset location levels of each data element in the one or more data elements of the object.

7. The method according to claim 1, wherein the receiving further comprises generating a query execution plan for the received query;

determining, at a query compilation time of the received query, an offset location of a first data element in the one or more data elements of the object;

storing, in the generated query execution plan of the received query, the determined offset location of the first data element; and storing the generated query execution plan;

the method further comprising receiving another query to access the first data element; and accessing, using the stored query execution plan, the first data element.

8. The method according to claim 1, wherein the object in the plurality of objects does not include an object schema.

9. A system comprising:

at least one programmable processor; and a non-transitory machine-readable medium storing instructions that, when executed by the at least one programmable processor, cause the at least one programmable processor to perform operations comprising:

generating a schema representing a structure of an object in a plurality of objects stored in a storage location, each object in the plurality of objects including one or more data elements, the schema identifying, for the object in the plurality of objects, one or more data elements of the object, an offset location of each of the one or more data elements of the object, and a value of each of the one or more data elements of the object;

receiving a query requesting access to at least one of the one or more data elements of the object in the plurality of objects;

identifying a generated schema in a plurality of generated schemas representing the object;

mapping the identified generated schema to a binary representation of the structure of the object, such that each row in the schema is mapped to an offset field in the binary representation, and each offset field is mapped to a value field in the binary representation;

accessing, using the binary representation of the structure of the object mapped to the identified generated schema, the one or more data elements of the object in the plurality of objects; and retrieving the one or more data elements of the object in the plurality of objects, wherein the generated schema identifies, using a skip list offset location in the object, one or more skip lists permitting skipping at least a portion of the one or more data elements of the object during the accessing and the retrieving, wherein the one or more skip lists are incorporated into a beginning of the binary representation of the structure of the object.

10. The system according to claim 9, wherein the generated schema is a fixed schema, the fixed schema preventing modification of the schema.

11. The system according to claim 9, wherein the generated schema is a mixed schema, the mixed schema allowing modification of the schema.

12. The system according to claim 11, wherein the operations further comprise adding identification of one or more another data elements of the object, an offset location of each another data element of the object, and a value of each another data element of the object.

13. The system according to claim 12, wherein the accessing includes accessing the one or more another data elements of the object, and the retrieving includes retrieving the one or more another data elements of the object.

14. The system according to claim 9, wherein the generated schema identifies one or more offset location levels of each data element in the one or more data elements of the object.

15. The system according to claim 9, wherein the receiving further comprises generating a query execution plan for the received query;

determining, at a query compilation time of the received query, an offset location of a first data element in the one or more data elements of the object;

storing, in the generated query execution plan of the received query, the determined offset location of the first data element; and storing the generated query execution plan;

the operations further comprising receiving another query to access the first data element; and accessing, using the stored query execution plan, the first data element.

16. The system according to claim 9, wherein the object in the plurality of objects does not include an object schema.

17. A computer program product comprising a non-transitory machine-readable medium storing instructions that, when executed by at least one programmable processor, cause the at least one programmable processor to perform operations comprising:

generating a schema representing a structure of an object in a plurality of objects stored in a storage location, each object in the plurality of objects including one or more data elements, the schema identifying, for the object in the plurality of objects, one or more data elements of the object, an offset location of each of the one or more data elements of the object, and a value of each of the one or more data elements of the object;

receiving a query requesting access to at least one of the one or more data elements of the object in the plurality of objects;

identifying a generated schema in a plurality of generated schemas representing the object;

mapping the identified generated schema to a binary representation of the structure of the object, such that each row in the schema is mapped to an offset field in the binary representation, and each offset field is mapped to a value field in the binary representation;

accessing, using the binary represent of the structure of the object mapped to the identified generated schema, the one or more data elements of the object in the plurality of objects; and retrieving the one or more data elements of the object in the plurality of objects, wherein the generated schema identifies, using a skip list offset location in the object, one or more skip lists permitting skipping at least a portion of the one or more data elements of the object during the accessing and the retrieving, wherein the one or more skip lists are incorporated into a beginning of the binary representation of the structure of the object.

* * * * *